(12) United States Patent
Dunbabin et al.

(10) Patent No.: US 8,315,789 B2
(45) Date of Patent: Nov. 20, 2012

(54) METHOD FOR PLANNING AND EXECUTING OBSTACLE-FREE PATHS FOR ROTATING EXCAVATION MACHINERY

(75) Inventors: Matthew Dunbabin, Wynnum West (AU); Peter Corke, Taringa (AU); Graeme Winstanley, Robertson (AU); Kane Usher, Eatons Hill (AU)

(73) Assignee: Commonwealth Scientific and Industrial Research Organisation (AU)

( * ) Notice: Subject to any disclaimer, the term of this patent is extended or adjusted under 35 U.S.C. 154(b) by 549 days.

(21) Appl. No.: 12/532,329

(22) PCT Filed: Jan. 16, 2008

(86) PCT No.: PCT/AU2008/000057
§ 371 (c)(1),
(2), (4) Date: Nov. 17, 2009

(87) PCT Pub. No.: WO2008/113098
PCT Pub. Date: Sep. 25, 2008

(65) Prior Publication Data
US 2010/0223008 A1 Sep. 2, 2010

(30) Foreign Application Priority Data
Mar. 21, 2007 (AU) ................. 2007901489

(51) Int. Cl.
*G08G 1/16* (2006.01)

(52) U.S. Cl. ........ 701/301; 701/468; 701/469; 701/532; 340/436; 340/903

(58) Field of Classification Search .......... 701/117, 701/301, 468–469, 26, 50, 532; 280/735; 340/435–436, 903; 299/1.05
See application file for complete search history.

(56) References Cited

U.S. PATENT DOCUMENTS
2,499,349 A 3/1950 Ayres
(Continued)

FOREIGN PATENT DOCUMENTS
AU 2004222734 1/2006
(Continued)

OTHER PUBLICATIONS
Minimum strain energy waypoint-following controller for directional drilling using OGH curves; Panchal, N.; Bayliss, M.T.; Whidborne, J.F.; Control Applications (CCA), 2011 IEEE International Conference on; Digital Object Identifier: 10.1109/CCA.2011.6044507; Publication Year: 2011, pp. 887-892.*
(Continued)

*Primary Examiner* — Cuong H Nguyen
(74) *Attorney, Agent, or Firm* — Brinks Hofer Gilson & Lione

(57) ABSTRACT

This invention concerns the control of rotating excavation machinery, for instance to avoid collisions with obstacles. In a first aspect the invention is a control system for autonomous path planning in excavation machinery, comprising: A map generation subsystem to receive data from an array of disparate and complementary sensors to generate a 3-Dimensional digital terrain and obstacle map referenced to a coordinate frame related to the machine's geometry, during normal operation of the machine. An obstacle detection subsystem to find and identify obstacles in the digital terrain and obstacle map, and then to refine the map by identifying exclusion zones that are within reach of the machine during operation. A collision detection subsystem that uses knowledge of the machine's position and movements, as well as the digital terrain and obstacle map, to identify and predict possible collisions with itself or other obstacles, and then uses a forward motion planner to predict collisions in a planned path. And, a path planning subsystem that uses information from the other subsystems to vary planned paths to avoid obstacles and collisions. In other aspects the invention is excavation machinery including the control system; a method for control of excavation machinery; and firmware and software versions of the control system.

19 Claims, 2 Drawing Sheets

U.S. PATENT DOCUMENTS

| | | | | |
|---|---|---|---|---|
| 5,612,883 | A * | 3/1997 | Shaffer et al. | 701/300 |
| 5,714,948 | A * | 2/1998 | Farmakis et al. | 340/961 |
| 5,850,341 | A * | 12/1998 | Fournier et al. | 701/50 |
| 5,892,462 | A * | 4/1999 | Tran | 340/961 |
| 6,055,042 | A | 4/2000 | Sarangapani | |
| 6,134,502 | A | 10/2000 | Sarangapani | |
| 6,223,110 | B1 * | 4/2001 | Rowe et al. | 701/50 |
| 6,363,632 | B1 * | 4/2002 | Stentz et al. | 37/414 |
| 6,393,362 | B1 * | 5/2002 | Burns | 701/301 |
| 6,454,036 | B1 * | 9/2002 | Airey et al. | 180/167 |
| 6,678,394 | B1 | 1/2004 | Nichani | |
| 6,694,233 | B1 | 2/2004 | Duff et al. | |
| 6,826,466 | B2 | 11/2004 | Rowlands et al. | |
| 7,114,430 | B2 * | 10/2006 | Reedy et al. | 91/392 |
| 7,418,346 | B2 * | 8/2008 | Breed et al. | 701/301 |
| 7,509,198 | B2 * | 3/2009 | Shull et al. | 701/50 |
| 8,019,514 | B2 * | 9/2011 | Yuet et al. | 701/50 |
| 8,139,108 | B2 * | 3/2012 | Stratton et al. | 348/114 |
| 2002/0075180 | A1 | 6/2002 | Sakai et al. | |
| 2004/0093122 | A1 | 5/2004 | Galibraith | |
| 2004/0210370 | A1 | 10/2004 | Gudat et al. | |
| 2005/0283294 | A1 | 12/2005 | Lehman, Jr. et al. | |
| 2007/0021915 | A1 * | 1/2007 | Breed et al. | 701/301 |
| 2007/0152804 | A1 * | 7/2007 | Breed et al. | 340/435 |
| 2007/0299590 | A1 * | 12/2007 | Shull et al. | 701/50 |
| 2010/0013615 | A1 * | 1/2010 | Hebert et al. | 340/425.5 |
| 2010/0250125 | A1 * | 9/2010 | Lundberg et al. | 701/208 |

FOREIGN PATENT DOCUMENTS

| | | | |
|---|---|---|---|
| DE | 10018873 | | 12/2001 |
| EP | 00556031 | | 8/1993 |
| FR | 2779832 | | 12/1999 |
| GB | 2332537 | A | 6/1999 |
| JP | 4-340603 | | 11/1992 |
| WO | WO2008504916 | | 11/1985 |
| WO | WO2005116348 | | 12/2005 |
| WO | PCT/EP07/56780 | * | 6/2010 |

OTHER PUBLICATIONS

Optimum Path Planning for Multi-robot H-beam Cutting System; Fan Mingyue; Xiao Juliang; Wang Gang Measuring Technology and Mechatronics Automation (ICMTMA), 2011 Third International Conference on vol. 2; Digital Object Identifier: 10.1109/ICMTMA. 2011.489; Publication Year: 2011, pp. 823-826.*

A framework for planning motion in environments with moving obstacles; Rodriguez, S.; Jyh-Ming Lien; Amato, N.M. Intelligent Robots and Systems, IROS 2007. IEEE/RSJ International Conference on; Digital Object Identifier: 10.1109/IROS.2007.4399540; Publication Year: 2007, pp. 3309-3314.*

Reactive Path Planning for 3-D Autonomous Vehicles; Belkhouche, F.; Bendjilali, B.; Control Systems Technology, IEEE Transactions on; vol. 20, Issue: 1; Digital Object Identifier: 10.1109/TCST.2011. 2111372 Publication Year: 2012, pp. 249-256.*

Field information systems for managing your assets; North, K.; Engineering the Benefits of Geographical Information Systems (Digest No. 1997/105), IEE Colloquium on; Digital Object Identifier: 10.1049/ic:19970584; Publication Year: 1997, pp. 6/1-6/7.*

Applications of remotely controlled equipment in Norwegian marine archaeology; Jasinski, M.E.; Sortland, B.; Soreide, F.; OCEANS '95. MTS/IEEE. Challenges of Our Changing Global Environment. Conference Proceedings.; vol. 1; Digital Object Identifier: 10.1109/OCEANS.1995.526818.*

Development of an unmanned coal mining robot and a tele-operation system; Sungsik Huh; Unghui Lee; Hyunchul Shim; Jong-Beom Park; Jong-Ho Noh; Control, Automation and Systems (ICCAS), 2011 11th International Conference on; Publication Year: 2011, pp. 31-35.*

Ormen Lange: investigation and excavation of a shipwreck in 170m depth; Soreide, F.; Jasinski, M.E.; OCEANS, 2005. Proceedings of MTS/IEEE; Digital Object Identifier: 10.1109/OCEANS.2005. 1640113; Publication Year: 2005, pp. 2334-2338 vol. 3.*

A.T. Le, Q.H. Nguyen, Q.P. Ha, D.C. Rye, H.F. Durrant-Whyte, M. Stevens, and V. Boget, "Towards autonomous excavation," Proc. Int. Conf. on Field and Service Robotics, pp. 121-126, 1997.

S. Singh, "The State of the Art in Automation of Earthmoving," ASCE Journal of Aerospace Engineering, vol. 10, No. 4, Oct. 1997.

S. Singh and H. Cannon, "Multi-Resolution Planning for Earthmoving," Proceedings of International Conference on Robotics and Automation, Leuven Belgium, May 1998.

A. Stentz, J. Bares, S. Singh, and P. Rowe, "A Robotic Excavator for Autonomous Truck Loading," Autonomous Robots 7(2):175-186, Sep. 1999.

E. Widzyk-Capehart, G. Brooker, R. Hennessy and C. Lobsey, "Rope Shovel Environment Mapping for Improved Operation Using Millimetre Wave Radar," Proceedings of the 2005 Australian Mining Technology Conference, Western Australia, Sep. 26-28, 2005 pp. 123-138.

E. Widzyk-Capehart and A. McDonald, "Rope Shovel Productivity Improvements—Site Trials Experimental Design," 13th International Symposium on Mine Planning and Equipment Selection-MPES 2004, Wroclaw, Poland, Sep. 1-3, 2004, pp. 629-636.

E. Widzyk-Capehart and P. Lever, "Towards Rope Shovel Automation Operator Information System", Proceedings of the 2004 CRCMining Research and Effective Technology Transfer Conference, Noosa, Australia, Jun. 15-16, 2004.

International Search Report and Written Opinion for PCT Application No. PCT/AU2008/000057, 9 pages, Mar. 17, 2008.

International Preliminary Report on Patentability for PCT Application No. PCT/AU2008/000057, 7 pages, Feb. 19, 2009.

* cited by examiner

METHOD FOR PLANNING AND EXECUTING OBSTACLE-FREE PATHS FOR ROTATING EXCAVATION MACHINERY

This application is a filing under 35 U.S.C. §371 of International Patent Application PCT/AU2008/000057, filed Jan. 16, 2008, which claims priority to Australian Application No. 2007901489, filed Mar. 21, 2007.

TECHNICAL FIELD

This invention concerns the control of rotating excavation machinery, for instance to avoid collisions with obstacles. In its various aspects the invention includes a control system for autonomous path planning in excavation machinery; excavation machinery including the control system; a method for control of excavation machinery; and firmware and software versions of the control system.

BACKGROUND ART

In mining applications generally the situational awareness of the operators of large excavation machinery, such as draglines, shovels and excavators, is very important. Current best practice for obstacle avoidance is centred on the training of the operators. Operators primarily rely on the visual sighting of obstacles, and their knowledge of a machine's behaviour to plan safe and effective paths for the machine's operation.

However, human vision is affected in times of limited visibility, for example, at night or during periods of high atmospheric dust content. This has implications for detecting and avoiding obstacles such as large boulders, trucks and other equipment, as well as collision detection with the digface, the machine itself, other machines and ground personnel. In addition, there can be large variations in the skill level and productivity of different operators, or of a single operator during a shift cycle.

Various attempts have been made to improve situational awareness for an operator by inclusion of cameras and other means of imaging the scene. Unfortunately, these often distract the operator from their primary task, and still suffer many of the 'blinding' limitations caused by dust and low-light.

SUMMARY OF THE INVENTION

The invention is a control system for autonomous path planning in excavation machinery, comprising:
- A map generation subsystem to receive data from an array of disparate and complementary sensors to generate a 3-Dimensional digital terrain and obstacle map referenced to a coordinate frame related to the machine's geometry, during normal operation of the machine.
- An obstacle detection subsystem to find and identify obstacles in the digital terrain and obstacle map, and then to refine the map by identifying exclusion zones that are within reach of the machine during operation.
- A collision detection subsystem that uses knowledge of the machine's position and movements, as well as the digital terrain and obstacle map, to identify and predict possible collisions with itself or other obstacles, and then uses a forward motion planner to predict collisions in a planned path.
- A path planning subsystem that uses information from the other subsystems to vary planned paths to avoid obstacles and collisions.

The invention is suitable for excavation machinery having a central axis of rotation such as draglines, shovels and excavators.

The array of sensors used to generate terrain and obstacle map may comprise passive sensors such as vision sensors; active sensors such as laser rangefinders or radar rangefinders; and GPS sensors. These sensors may be mounted on or off the machine, or both. to collect a range of data. The invention is able to fuse on-board sensors to improve map generation and visibility; and off-board sensors to assist in building the situational awareness map and highlight potential hazards and obstacles.

In addition, these sensors may be used to estimate the volumes of overburden moved and to automatically guide the machine during digging and loading operations.

The maps are dynamically constructed during normal operation of the machine to improve the situational awareness of operators. The maps may be geo-referenced via GPS or relative with respect to the excavation machinery.

In the case of items which cannot be identified with other sensors—for example humans, other vehicles entering the workspace, or no-go zones—virtual obstacles may be incorporated into the maps at any time to limit the operation of the machine. These virtual obstacles can be incorporated into the obstacle map at any time to limit operations.

In addition, safety zones or "safety bubbles" may be assigned to the obstacles detected in a terrain and obstacle map to define the minimum clearance area for the machine to avoid collision.

The knowledge of the machine's position and movements may be either a priori or learned online. To determine how the machine will respond to inputs, that is to predict how it moves, one or more of the following is required: the machine's geometry; the critical states of the machine such as joint angles and rope lengths; and the dynamic aspects of the machine such as its motor response times.

Path planning is performed using knowledge of the machine's current and desired states and its movement in response to inputs. The collision-free, optimal path is generated via a Safe Traversal Obstacle Map (STOM) and may be calculated based on criteria such as the shortest path, potential energy, minimum energy used and the minimum time taken. Advantageously, path planning improves productivity by allowing operation in low-visibility conditions and improves operational safety by allowing the excavation machine to determine and avoid collisions with itself and other obstacles.

The path planning aspect of the invention may use any combination of well-known robotic path-planning methods, including on-line reactive type mechanism for emergency situations.

Additionally, the system can incorporate other situational maps, for example from other machines or off-board sensors, to improve the machine's own awareness of the environment.

The invention may support two control settings: partial or full automation; or a spectrum of control settings between partial and full automation. For example, partial automation could mean a system that takes over from an operator once a dig is complete, performs the swing and dump and then returns ready for the next dig. It may also be a system that the operator controls but it prevents the operator from performing a demand, or altered demands to the machine, in order to avoid collisions. Possible collisions and the obstacle-free path generated by the invention may also be displayed to the operator of the machine. When full automation is used, the obstacle-free path generated by the invention is automatically executed by the machine.

Additionally, the invention may be run on-board, that is from the machine; or off-board, that is from a remote location that is in communication with the machine via wired or wireless link. This allows mining workers other than the operator of an excavation machine to monitor and mitigate the problems faced by the operator during an excavation operation.

The invention may be used to determine the optimum dig location and indicate when to move the machine when repositioning.

In further aspects the invention is excavation machinery including the control system, a method for control of excavation machinery; and firmware and software versions of the control system.

BRIEF DESCRIPTION OF THE DRAWINGS

An example of the invention will now be described with reference to the accompanying drawings, in which.

BEST MODES OF THE INVENTION

Figure 1:
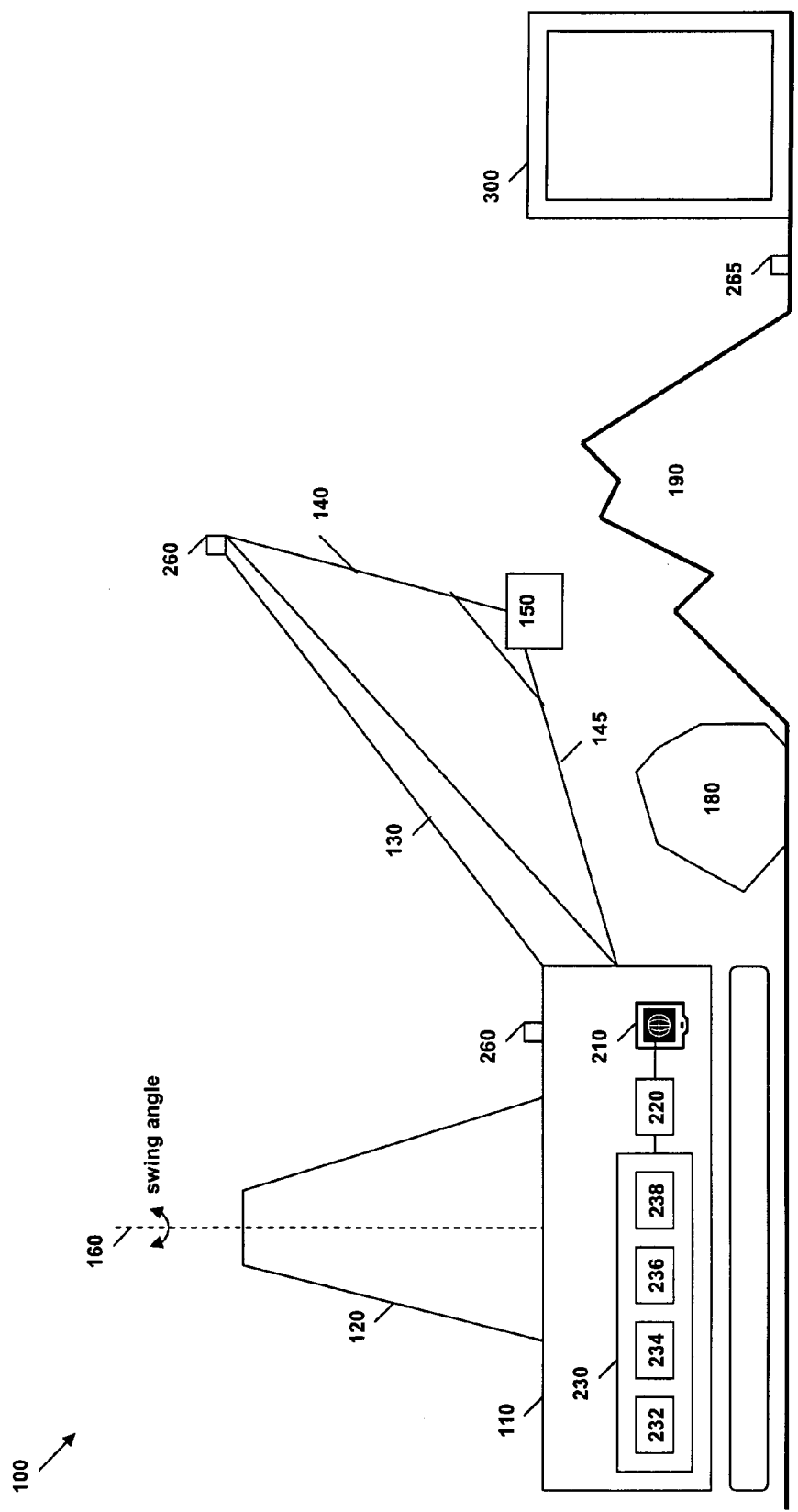
FIG. 1 is a diagram of a dragline equipped with an autonomous path planning system.

Referring first to FIG. 1, dragline 100 comprises a house 110, a mast 120, a boom 130, hoist ropes 140, drag ropes 145 and a bucket 150 suspended from the boom 130 by the hoist ropes 140. The entire dragline 100 is able to swing about its vertical axis 160. In a typical excavation cycle, the bucket 150 is first lowered to scoop material from the excavation site 190. The bucket 150 is then dragged towards the house 110 using drag ropes 145 and lifted using hoist ropes 140, filling the bucket 150. Next, the dragline 100 is swung about vertical swing axis to position the bucket 150 above the place where the material is to be dumped. The dragline 100 is typically operated using sensors and actuators under the control of code in a Programmable Logic Controller (PLC).

The swing operation typically accounts for 80% of the time of an excavation cycle. In current systems, operators rely on their knowledge of the machine's behaviour as well as visual sighting of obstacles to plan and execute the swing operation. Obstacles that may be present at a mining site might include vehicles such as trucks, mining workers, other site equipment and rocks, see 180.

In addition, system 230 may be located off-board in a remote location 300 (see FIG. 1) that communicates with the machine 100 via a radio or wired communication link. Data collected by the on-board 260 and off-board 265 sensors is transmitted to the remote location to perform map generation, obstacle detection, collision detection and path planning. The planning solutions are then communicated to the machine 100 to either assist the operator partially or completely.

Figure 2:
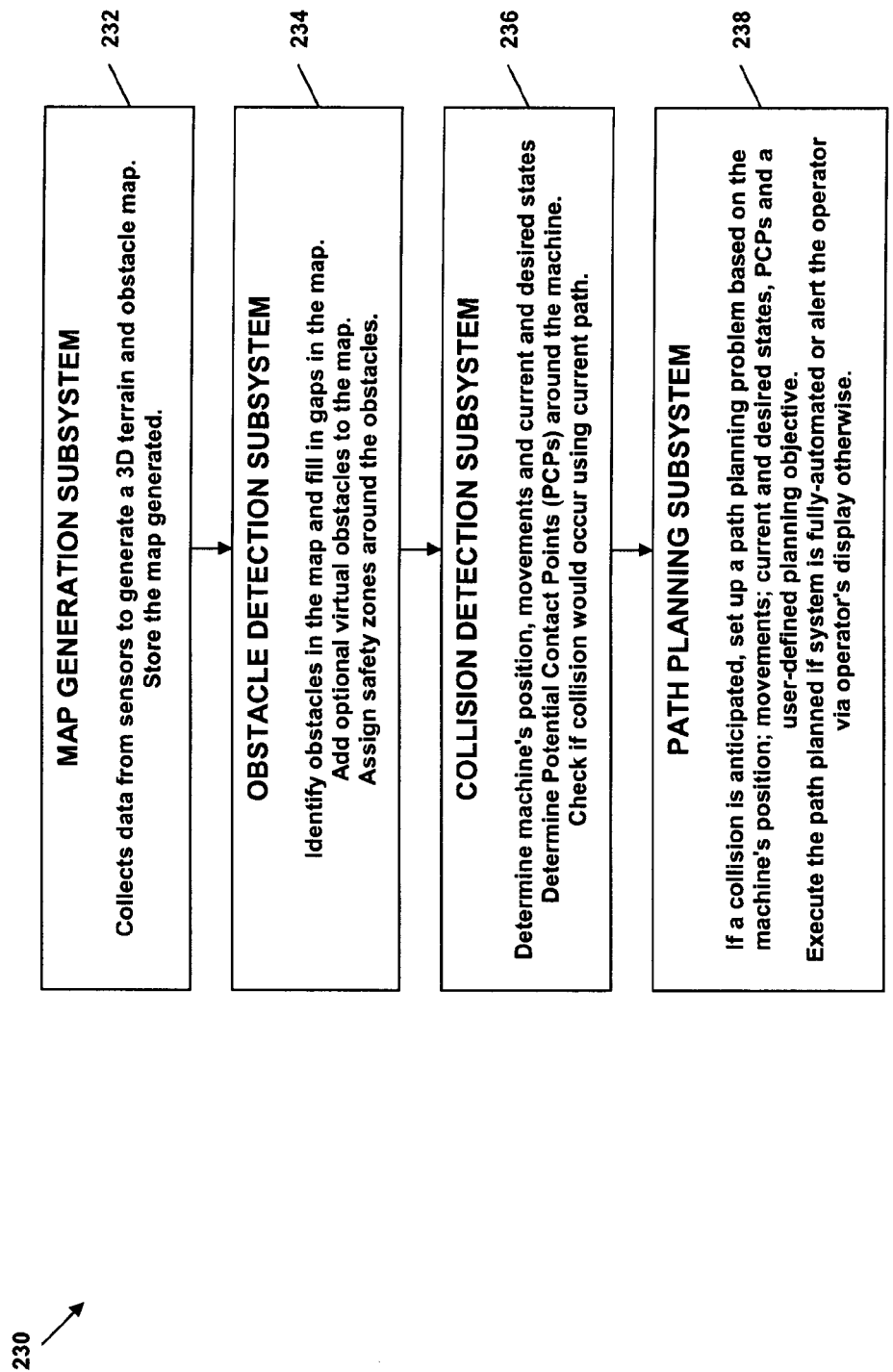
FIG. 2 is a flow chart of operation of the autonomous path planning system.

Referring now to FIG. 2, the autonomous path planning system 200 comprises a display 210 for the operator of the dragline 100, a computer storage medium 220, a number of on-board 260 and off-board 265 sensors and a control system 230 comprising the following subsystems:

Map generation subsystem 232;
Obstacle detection subsystem 234;
Collision detection subsystem 236; and
Path planning subsystem 238.

Map generation 232, obstacle detection 234, collision detection 236 and path-planning 238 subsystems may comprise software located in a separate computer (PC) or microcontroller which interfaces with the dragline 100, control system 230 and operator display 210. Alternatively, all or part of the control system 230 and its subsystems may be embedded within a Programmable Logic Controller (PLC); for instance the PLC that controls the dragline 100.

The subsystems 232, 234, 236 and 238 will now be explained in greater detail:

Map Generation Subsystem 232

Map generation subsystem 232 uses an array of disparate and complementary sensors to generate directly, or add to an existing, 3-Dimensional digital terrain and obstacle map during normal operation of the dragline 100. The sensors may be either retrofitted or installed during manufacture. Any number and type of sensor systems may be incorporated depending on the requirements and the capabilities of the system. For example, passive (vision), active (laser, radar) and GPS sensors can be used to generate the map.

The sensors may be mounted on 260 or off 265 the machine 100, and are placed to maximize the utility of the data collected. In some situations it has been found that when the dragline is swinging, body and boom mounted sensors 260 are more useful, and while the bucket, or other excavator tools, are moving other sensors 265 mounted off the dragline are better.

The obstacle and terrain maps are built using knowledge of the sensor geometric offsets from the centre of machine rotation 160 and the knowledge of the machine's current rotational position. These maps may be static or dynamically updated, or both, during normal operation of the machine 100. The map may be referenced to an appropriate coordinate frame with respect to the machine. This coordinate frame can be geo-referenced via GPS or other external positioning device for integration with a global map. The map may be transformed to another coordinate system, for instance if roll and pitch measurements are available.

The digital terrain and obstacle maps of the vicinity around the machine 100 are used to measure the location and volume of material in the spoil pile, and to locate obstacles 180.

Virtual objects may be incorporated into the map to limit the operation of the machine. These may include areas that the machine must not operate in, or inclusion of people or equipment that are dynamic in nature, or not visible to the sensor system. The maps may be displayed to an operator, either on-board the machine 100 or in a remote location 300. The operator may manipulate the view point of the 3D maps using keyboard, mouse or touch-screen. The maps may be stored either locally on storage medium 220 or externally in a remote location 300 in any digital format.

Obstacle Detection Subsystem 234

The obstacle detection subsystem 234 refines the digital terrain and obstacle map generated by the map generation subsystem 232 to identify exclusion zones that are within reach of the machine during operation. First, an object detection system is used to find or identify obstacles such as vehicles, equipment, rocks and the machine's own crawlers from the map. The subsystem also fills any 'holes' or 'gaps' in the map in which no valid sensor date is available.

Once the obstacles are identified, safety zones or safety bubbles are dynamically assigned around any obstacles in the situational awareness map to define exclusion areas. The size of each safety zone is chosen to ensure adequate clearance and access to key areas in the machine's operational range. For example, the size of a safety zone may be zero around a dig face; 0.5 m around the crawlers of trucks and rocks on the ground; and 5 m around humans.

Additionally, the system is capable of not only detecting obstacles, but tracking their movement throughout the workspace. Workers and vehicles entering the workspace may carry a trackable identification tag for this purpose; allowing the excavator to detect them and the system to gather information about their movements. A large safety bubble can be assign to these trackable objects to ensure that the bucket or other part of the machine cannot collide with them.

Collision Detection Subsystem 230

The collision detection subsystem 230 uses the terrain and obstacle map generated by map generation subsystem 232, and further refined by the obstacle detection subsystem 234, and its knowledge of the machine's 100 position and movements to determine possible collisions with itself or other obstacles. The system can also incorporate other situational maps, for example from other machines, to improve the machine's own awareness of the environment.

In particular, the 3D position of Potential Contact Points (PCP) around the machine 100 are determined using measured or inferred machine geometry. Examples of PCPs include bucket corners, dipper, boom, tub, ropes and actuators. Other points may include 'virtual' points which are not physically located on the machine. The data on the machine's geometry may be based on a priori knowledge or learned online during operation.

To predict how the machine moves in response to inputs, the knowledge of one or more of the following is required:
  the geometry of the machine;
  the estimates of the critical states such as joint angles and rope lengths;
  the current and desired states of the machine; and
  other dynamic aspects of the machine operation such as motor response times.

Using the obstacle map, a forward motion planner then predicts (at different timescales) the motion of all the Potential Contact Points (PCPs) in 3D space to determine if a collision of any of these points will occur. If any of the Potential Contact Points are found to intersect, that is collide, with the obstacle map, the collision information is passed to the path planning subsystem 238 to modify the desired path accordingly.

Path Planning Subsystem 238

Path planning subsystem 238 uses the knowledge of the surrounding environment of the machine 100 and how the machine moves in response to inputs to determine obstacle-free paths when planning a swing operation. Well-known robotic path-planning methods are used to generate a collision-free swing angle and bucket trajectory, taking into account the safety zones around the obstacles and any additional virtual obstacles imposed by the operator.

The path planning problem is set up using an appropriate cost or objective function describing the operation. The collision-free, optimal path is generated via a Safe Traversal Obstacle Map (STOM) and may be calculated based on criteria such as the shortest path, the minimum energy used, the minimum time taken and the safest path. Depending on the requirements of a particular swing operation, the collision detection is not limited to the bucket and may include all elements of the machine and the detected environment, including self collision.

The computed optimal path is then displayed on the operator's display to request further actions from the operator. Alternatively, if the machine is fully automated, the computed optimal path will be translated to a sequence of machine commands to be executed by the machine control system.

Partial or Full Automation

Using the invention, the machine 100 may be partially or fully automated, allowing the system 230 to warn the operator via the display 210 or via audible alarms; or taking over control of the machine control when a possible collision is detected.

In the case of partial autonomy the system acts much like an "operator-assist" system to provide guidance to the operator for safe bucket and swing trajectories. Here, the path planning subsystem 238 uses the obstacle 234 and collision 236 detection subsystems to generate control actions to avoid collisions or stop the machine completely. The control can be applied to any axis of the machine, and is not necessarily restricted to swing and bucket movement. Depending on the level of allowable autonomy, the on-board control system executes the demands from the path planner.

In the case of a fully-automated system, the path planning subsystem 238 controls all actions of the excavation cycle using inputs from the obstacle 234 and collision 236 detection subsystems.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. For example, the invention 200 can be installed on other excavation machineries that have a swing axis during normal excavation, such as electric and hydraulic mining shovels and excavators.

The invention claimed is:

1. A control system for autonomous path planning in excavation machinery, comprising:
  a map generation subsystem to receive data from an array of sensors to generate a 3-Dimensional digital terrain and obstacle map;
  an obstacle detection subsystem to find and identify obstacles in the digital terrain and obstacle map, and then to refine the map by identifying 3-Dimensional exclusion zones that are within reach of the machine during operation;
  a collision detection subsystem that uses knowledge of the machine's position and movements, as well as the digital terrain and obstacle map, to identify possible collisions with itself, the obstacles and the exclusion zones in the refined map;
  a forward motion planning subsystem to predict collisions in a planned path; and
  a path planning subsystem that uses information from the other subsystems to vary planned paths to avoid collisions.

2. A control system according to claim 1, wherein the excavation machinery has a central axis of rotation and at least one sensor is mounted on a boom of the machinery.

3. A control system according to claim 2, wherein the machinery is a dragline, shovel or excavator.

4. A control system according to claim 1, wherein the array of sensors used to generate the terrain and obstacle map comprises passive sensors and active sensors.

5. A control system according to claim 4, wherein the passive sensors include a vision sensor.

6. A control system according to claim 1, wherein the array of sensors includes an off-board sensor that is attached to a known movable obstacle, and the obstacle detection subsystem finds the known movable obstacle in the map based on data received from the off-board sensor.

7. A control system according to claim 6, wherein the obstacle detection subsystem is further operable to track movement of the known movable obstacle and the collision detection subsystem further identifies possible collisions with the known movable obstacle based on the tracked movement.

8. A control system according to claim 7, wherein the off-board sensor is a trackable identification tag that is attached to a human or an object.

9. A control system according to claim 1, wherein the 3-Dimensional digital terrain and obstacle map is dynamically constructed during normal operation of the machine.

10. A control system according to claim 1, wherein the 3-Dimensional digital terrain and obstacle map is referenced to a coordinate frame related to the machine's geometry, and is constructed during normal operation of the machine.

11. A control system according to claim 1, wherein virtual obstacles that are not detectable by the array of sensors are incorporated into the digital terrain and obstacle map at any time to limit the operation of the machine.

12. A control system according to claim 11, wherein 3-Dimensional safety zones are assigned to the obstacles detected in the digital terrain and obstacle map to define the minimum clearance area.

13. A control system according to claim 1, wherein path planning is performed using knowledge of the machine's current and desired states and its movement in response to inputs.

14. A control system according to claim 13, wherein the path planning is performed based on criteria such as the shortest path, minimum energy used and the minimum time taken.

15. A control system according to claim 1, wherein the system supports partial automation where possible collisions and the planned path is displayed to the operator of the machine.

16. A control system according to claim 1, wherein the system supports full automation where the planned path is automatically executed by the machine.

17. Excavation machinery including a control system according to claim 1.

18. A method for control of excavation machinery, comprising the steps of:
  receiving data from an array of sensors to generate a 3-Dimensional digital terrain and obstacle map;
  finding and identifying obstacles in the digital terrain and obstacle map, and then refining the map by identifying 3-Dimensional exclusion zones that are within reach of the machine during operation;
  using knowledge of the machine's position and movements, as well as the digital terrain and obstacle map, to identify possible collisions with itself, the obstacles and the exclusion zones in the refined map;
  predicting collisions in a planned path; and
  using information from the other subsystems to vary planned paths to avoid collisions.

19. A control system according to claim 1, wherein the control system is located at a location remote to the machine, and communicates with the machine via a wireless link.

* * * * *